(12) United States Patent
Lee et al.

(10) Patent No.: US 12,500,722 B2
(45) Date of Patent: Dec. 16, 2025

(54) ELECTRONIC DEVICE FOR TRANSMITTING SOUNDING REFERENCE SIGNAL IN WIRELESS COMMUNICATION SYSTEM AND OPERATING METHOD THEREOF

(71) Applicant: SAMSUNG ELECTRONICS CO., LTD., Suwon-si (KR)

(72) Inventors: Byongok Lee, Suwon-si (KR); Joohyun Do, Suwon-si (KR); Hyunseok Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 380 days.

(21) Appl. No.: 18/097,944

(22) Filed: Jan. 17, 2023

(65) Prior Publication Data

US 2023/0231684 A1   Jul. 20, 2023

(30) Foreign Application Priority Data

Jan. 18, 2022 (KR) .................. 10-2022-0007451
Jun. 24, 2022 (KR) .................. 10-2022-0077816

(51) Int. Cl.
*H04L 7/04* (2006.01)
*H04L 5/00* (2006.01)
*H04L 25/03* (2006.01)

(52) U.S. Cl.
CPC ...... *H04L 5/0051* (2013.01); *H04L 25/03343* (2013.01)

(58) Field of Classification Search
CPC .. H04B 7/0404; H04B 7/0456; H04B 7/0486; H04B 7/0691; H04B 7/06966;
(Continued)

(56) References Cited

U.S. PATENT DOCUMENTS 9,001,780 B2   4/2015   Chen et al.
9,300,451 B2   3/2016   Papasakellariou et al.
(Continued)

FOREIGN PATENT DOCUMENTS

JP   2021100148 A    7/2021
KR   101578453 B1   12/2015
(Continued)

OTHER PUBLICATIONS

Salo, Sounding reference signal-based covariance matrix estimation for beamforming purposes in massive multiple-input, multiple-output antenna systems in 5G networks, Thesis, Aalto University School of Electrical Engineering, 78 pages, Feb. 23, 2020.*
(Continued)

*Primary Examiner* — Frank Duong
(74) *Attorney, Agent, or Firm* — Sughrue Mion, PLLC

(57) ABSTRACT

An electronic device including a communication circuit configured to receive a reception signal including an interference signal, and to transmit a sounding reference signal (SRS) to a base station; and a control circuit comprising an interference estimation circuit configured to detect the interference signal in the reception signal, and a precoding matrix calculation circuit configured to generate an SRS precoding matrix corresponding to the SRS, based on a detection result obtained by the interference estimation circuit, wherein the control circuit is configured to control the communication circuit to transmit the SRS to the base station, and wherein the SRS is generated by multiplying a transmission signal by the SRS precoding matrix.

18 Claims, 10 Drawing Sheets

(58) Field of Classification Search
CPC . H04B 17/345; H04L 5/0051; H04L 25/0224; H04L 25/0226; H04L 25/0228; H04L 25/03343; H04W 72/21
See application file for complete search history.

(56) References Cited

U.S. PATENT DOCUMENTS

| | | | |
|---|---|---|---|
| 9,350,475 | B2* | 5/2016 | Yoo .................. H04L 25/03891 |
| 9,503,299 | B2 | 11/2016 | Noh et al. |
| 9,531,514 | B2 | 12/2016 | Luo et al. |
| 9,813,179 | B2* | 11/2017 | Tsai ...................... H04L 5/0073 |
| 9,923,686 | B2 | 3/2018 | Kim et al. |
| 10,764,016 | B2 | 9/2020 | Kim et al. |
| 10,778,284 | B2 | 9/2020 | Kim et al. |
| 2013/0188502 | A1 | 7/2013 | Yang et al. |
| 2015/0215061 | A1 | 7/2015 | Tsai et al. |
| 2018/0337716 | A1* | 11/2018 | Fakoorian ............ H04B 7/0691 |
| 2024/0364563 | A1* | 10/2024 | Elshafie ................ H04L 25/021 |

FOREIGN PATENT DOCUMENTS

| | | |
|---|---|---|
| KR | 101612799 B1 | 4/2016 |
| KR | 102290418 B1 | 8/2021 |
| WO | 2012/018611 A1 | 2/2012 |

OTHER PUBLICATIONS

Qualcomm Incorporated, "Views on SRS", 3GPP TSG-RAN WG1 #87, R1-1612049, Nov. 2016, 4 pages, XP051176010.
Communication issued on May 23, 2023 by the European Patent Office for European Patent Application No. 23152285.5.
Communication issued on Jul. 17, 2023 by the European Patent Office for European Patent Application No. 23152285.5.

* cited by examiner

ELECTRONIC DEVICE FOR TRANSMITTING SOUNDING REFERENCE SIGNAL IN WIRELESS COMMUNICATION SYSTEM AND OPERATING METHOD THEREOF

CROSS-REFERENCE TO RELATED APPLICATIONS

This application is based on and claims priority under 35 U.S.C. § 119 to Korean Patent Application No. 10-2022-0007451, filed on Jan. 18, 2022 and Korean Patent Application No. 10-2022-0077816, filed on Jun. 24, 2022, in the Korean Intellectual Property Office, the disclosures of which are incorporated by reference herein in their entirety.

BACKGROUND

1. Field

The disclosure relates to a method of transmitting a signal and an electronic device, and more particularly, to an electronic device for transmitting a sounding reference signal (SRS) in a wireless communication system and an operating method thereof.

1. Description of Related Art

To meet wireless data traffic demand that is growing since commercialization of 4th generation (4G) communication systems, many efforts have been put to develop improved 5th generation (5G) or pre-5G communication systems. For this reason, 5G or pre-5G communication systems are also called new radio (NR) systems in the 3rd Generation Partnership Project (3GPP) standard.

To achieve a high data transmission rate, 5G communication systems are considered to be embodied in a millimeter wave (mmWave) band (e.g., a 28-GHz band or a 39-GHz band). To alleviate the path loss of radio waves and increase the propagation range of radio waves in the mmWave band, beamforming, massive multiple-input multiple-output (MIMO), full dimension MIMO (FD-MIMO), array antenna, analog beamforming, hybrid beamforming, and large scale antenna techniques are being examined.

SUMMARY

Provided are an electronic device for generating a precoding matrix by using an interference estimation result of a terminal and transmitting a sounding reference signal (SRS), based on the precoding matrix, and an operating method thereof.

Additional aspects will be set forth in part in the description which follows and, in part, will be apparent from the description, or may be learned by practice of the presented embodiments.

In accordance with an aspect of the disclosure, an electronic device includes a communication circuit configured to receive a reception signal including an interference signal, and to transmit a sounding reference signal (SRS) to a base station; and a control circuit comprising an interference estimation circuit configured to detect the interference signal in the reception signal, and a precoding matrix calculation circuit configured to generate an SRS precoding matrix corresponding to the SRS, based on a detection result obtained by the interference estimation circuit, wherein the control circuit is configured to control the communication circuit to transmit the SRS to the base station, and wherein the SRS is generated by multiplying a transmission signal by the SRS precoding matrix.

In accordance with an aspect of the disclosure, an operating method of an electronic device includes performing interference estimation based on a reception signal including an interference signal; generating a sounding reference signal (SRS) precoding matrix, based on a result of the interference estimation; and transmitting an SRS to a base station, wherein the SRS is generated by multiplying a transmission signal by the SRS precoding matrix.

In accordance with an aspect of the disclosure, a wireless communication system includes a base station configured to estimate a downlink channel based on a sounding reference signal (SRS); and an electronic device including: a communication circuit configured to perform at least one from among transmitting the SRS to the base station and receiving a reception signal including an interference signal, and a control circuit comprising an interference estimation circuit configured to detect the interference signal in the reception signal, and a precoding matrix calculation circuit configured to generate an SRS precoding matrix corresponding to the SRS, based on a detection result obtained by the interference estimation circuit, wherein the control circuit is configured to control the communication circuit to transmit the SRS to the base station, and wherein the SRS is generated by multiplying a transmission signal by the SRS precoding matrix.

In accordance with an aspect of the disclosure, an electronic device includes a communication circuit configured to communicate with a base station; and a control circuit configured to: control the communication circuit to obtain a reception signal from the base station, detect an interference signal in the reception signal, generate a sounding reference signal (SRS) precoding matrix based on the interference signal, generate a SRS by multiplying a transmission signal by the SRS precoding matrix, and control the communication circuit to transmit the SRS to the base station.

BRIEF DESCRIPTION OF THE DRAWINGS

The above and other aspects, features, and advantages of certain embodiments of the present disclosure will be more apparent from the following description taken in conjunction with the accompanying drawings in which.

DETAILED DESCRIPTION OF EMBODIMENTS

Figure 1:
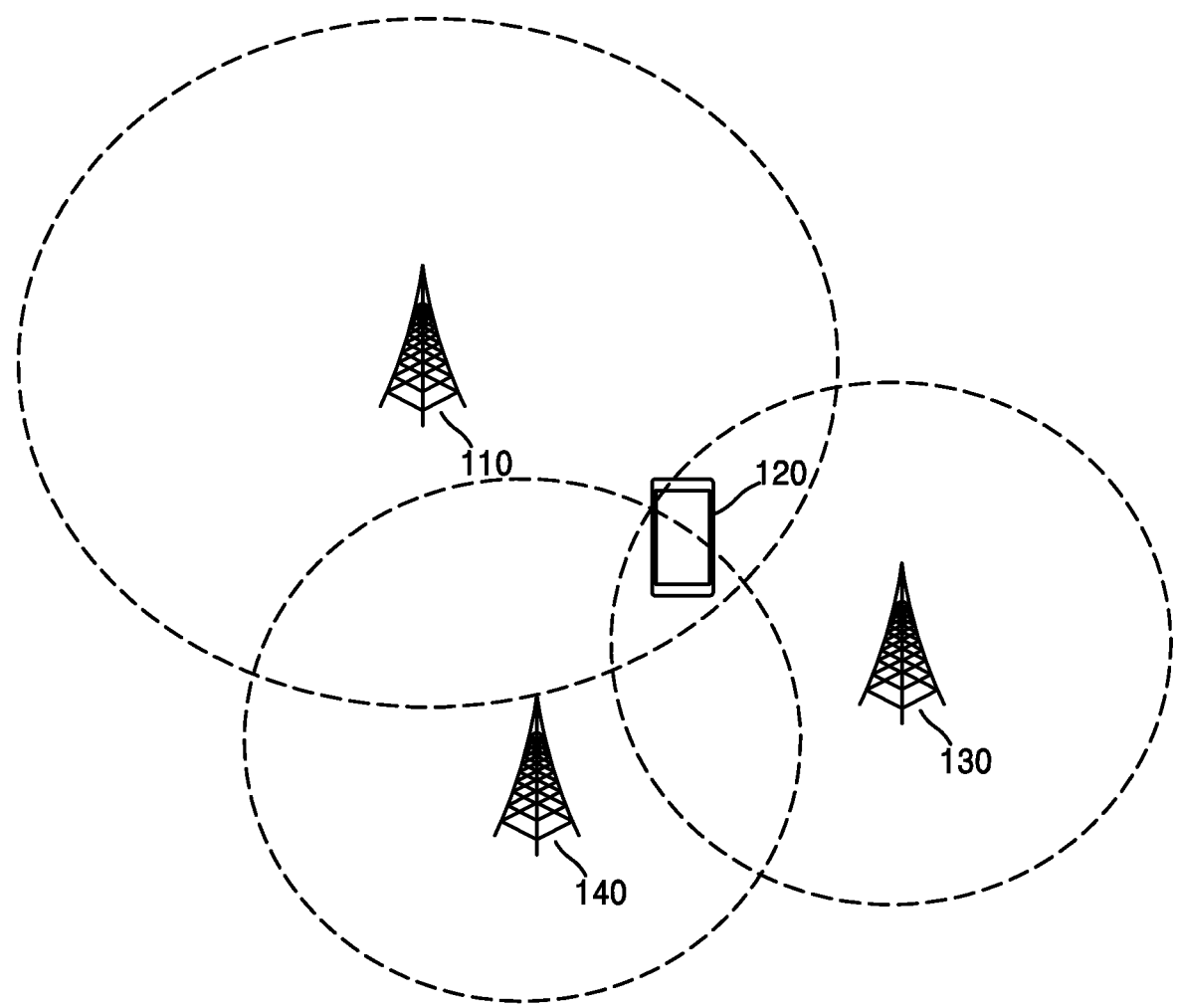
FIG. 1 illustrates a wireless communication system according to an embodiment.

Hereinafter, embodiments are described in detail with reference to the accompanying drawings.

As is traditional in the field, embodiments may be described and illustrated in terms of blocks which carry out a described function or functions. These blocks, as shown in the drawings, which may be referred to herein as "units" or "modules" or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

FIG. 1 illustrates a wireless communication system according to an embodiment.

Referring to FIG. 1, a wireless communication system may include a base station 110, an electronic device 120, and neighboring base stations 130 and 140.

According to various embodiments, the base station 110 may be a network infrastructure that provides wireless access to the electronic device 120. The base station 110 may have coverage that is determined by a certain geometrical area based on a distance, by which a signal may be transmitted. The base station 110 may be referred to as an access point (AP), an evolved-node B (eNodeB or eNB), a 5*th* generation (5G) node, a wireless point, or another term having a technical meaning equivalent thereto.

According to various embodiments, the base station 110 may be connected to at least one transmission/reception point (TRP). The base station 110 may transmit a downlink signal to the electronic device 120 or receive an uplink signal from the electronic device 120 through at least one TRP.

According to various embodiments, as a device used by a user, the electronic device 120 may communicate with the base station 110 through a wireless channel. The electronic device 120 may be referred to as a terminal, a user equipment (UE), a mobile station, a subscriber station, a customer premises equipment (CPE), a remote terminal, a wireless terminal, a user device, or another term having a technical meaning equivalent thereto.

According to various embodiments, the electronic device 120 may receive interference signals from the neighboring base stations 130 and 140. For example, the electronic device 120 may receive a downlink signal from the base station 110, and simultaneously signals generated by the neighboring base stations 130 and 140 may respectively correspond to interference signals.

Figure 2:
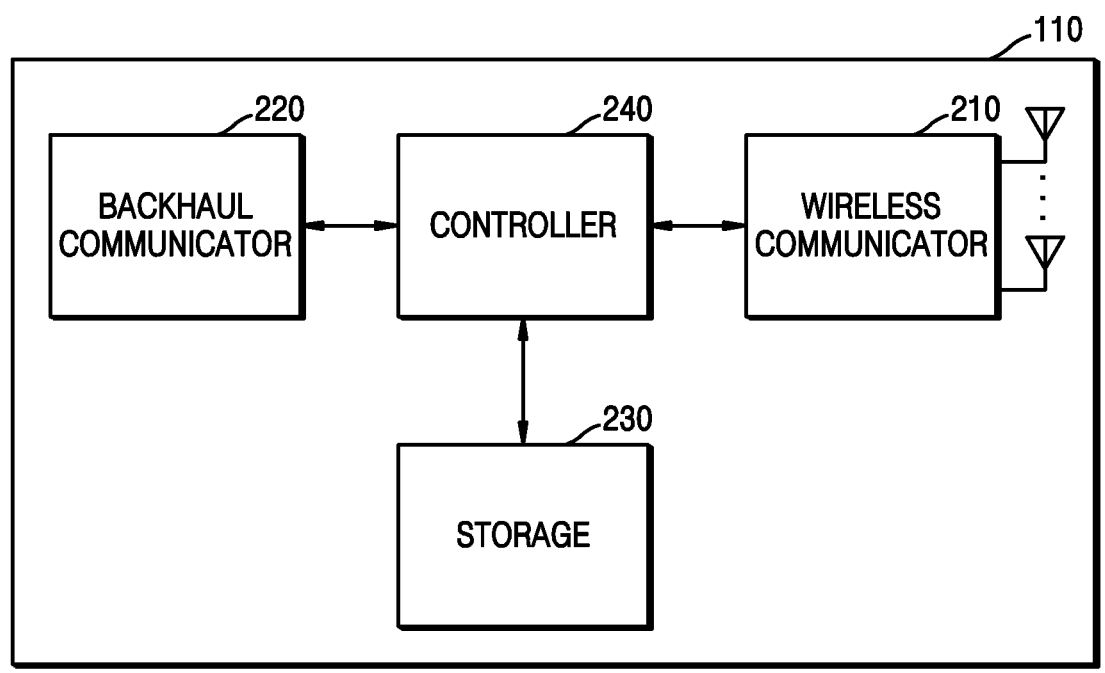
FIG. 2 is a block diagram of a base station according to embodiments.

FIG. 2 is a block diagram of the base station 110 according to embodiments.

Referring to FIG. 2, the base station 110 may include a wireless communicator 210, a backhaul communicator 220, a storage 230, and a controller 240.

The wireless communicator 210 may perform functions for transmission and reception of signals through a wireless channel. According to an embodiment, the wireless communicator 210 may perform conversion between a baseband signal and a bitstream according to the physical layer standard of a system. For example, the wireless communicator 210 may generate complex symbols by encoding and modulating a transmitted bitstream during data transmission and reconstruct a received bitstream by demodulating and decoding a baseband signal during data reception. The wireless communicator 210 may up-convert a baseband signal into a radio frequency (RF) band signal and transmit the RF band signal through an antenna or may down-convert an RF band signal received through an antenna into a baseband signal. For these operations, the wireless communicator 210 may include a transmission filter, a reception filter, an amplifier, a mixer, an oscillator, a digital-to-analog converter (DAC), an analog-to-digital converter (ADC), and the like.

The wireless communicator 210 may transmit and receive signals. For example, the wireless communicator 210 may transmit a synchronization signal, a reference signal, system information, a message, control information, data, or the like. The wireless communicator 210 may perform beamforming. To give an orientation to a signal to be transmitted or received, the wireless communicator 210 may apply a beamforming weight to the signal. The wireless communicator 210 may change a formed beam and repeatedly transmit a signal.

The backhaul communicator 220 may provide an interface for communication with other nodes in a network. For example, the backhaul communicator 220 may convert a bitstream, which is transmitted from the base station 110 to another node, e.g., another access node, another base station, an upper node, or a core network, into a physical signal and may convert a physical signal received from another node into a bitstream.

The storage 230 may store data, such as a basic program for the operation of the base station 110, an application program, configuration information, or the like. The storage 230 may include volatile memory, non-volatile memory, or a combination of volatile memory and non-volatile memory. The storage 230 may provide stored data at the request of the controller 240.

The controller 240 may control operations of the base station 110. For example, the controller 240 may transmit and receive signals through the wireless communicator 210 or the backhaul communicator 220. The controller 240 may write data to and read data from the storage 230. For these operations, the controller 240 may include at least one processor.

Figure 3:
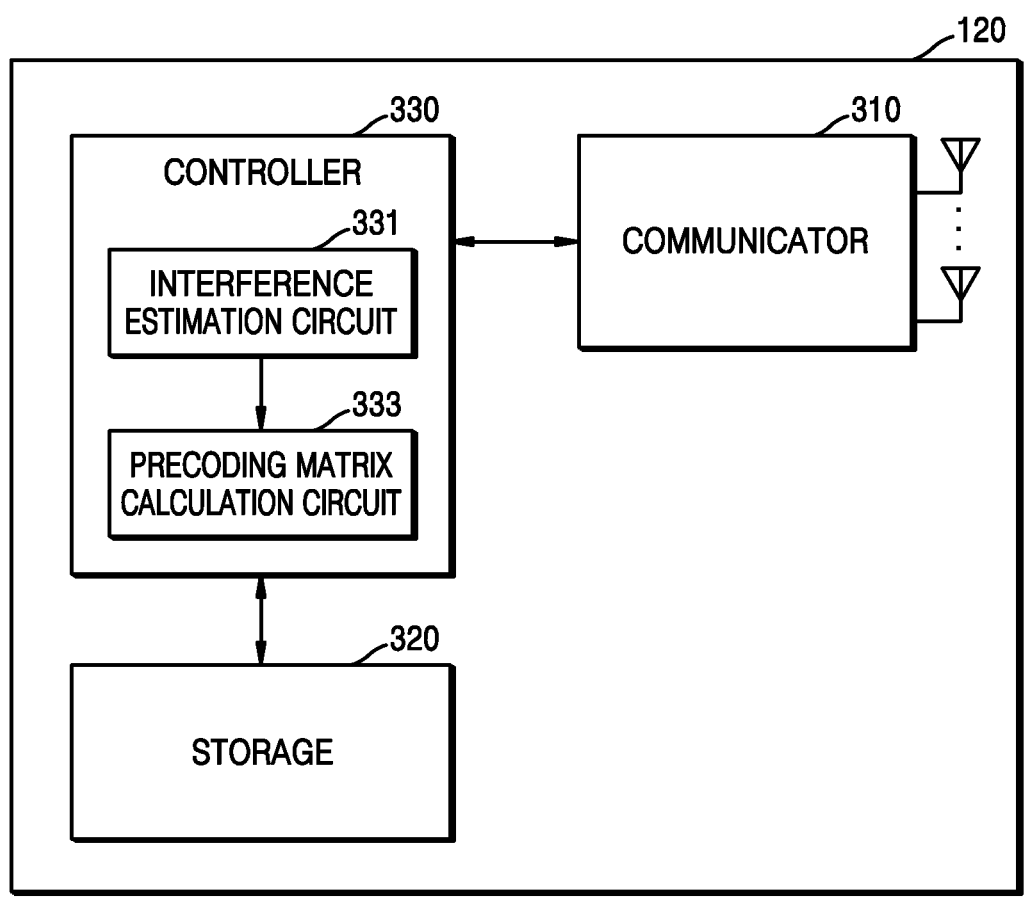
FIG. 3 is a block diagram of an electronic device according to embodiments.

FIG. 3 is a block diagram of the electronic device 120 according to embodiments.

Referring to FIG. 3, the electronic device 120 may include a communicator 310, a storage 320, and a controller 330.

The communicator 310 may perform functions for transmission and reception of signals through a wireless channel. For example, the communicator 310 may perform conversion between a baseband signal and a bitstream according to the physical layer standard of a system. For example, the communicator 310 may generate complex symbols by encoding and modulating a transmitted bitstream during data transmission and reconstruct a received bitstream by demodulating and decoding a baseband signal during data reception. The communicator 310 may up-convert a baseband signal into an RF band signal and transmit the RF band signal through an antenna or may down-convert an RF band signal received through an antenna into a baseband signal. For example, the communicator 310 may include a transmission filter, a reception filter, an amplifier, a mixer, an oscillator, a DAC, an ADC, and the like. The communicator 310 may perform beamforming. To give an orientation to a signal to be transmitted or received, the communicator 310 may apply a beamforming weight to the signal.

The communicator 310 may transmit and receive signals. The communicator 310 may receive a downlink signal. The downlink signal may include a synchronization signal, a reference signal, system information, a configuration message, control information, downlink data, or the like. The communicator 310 may transmit an uplink signal. The uplink signal may include a signal related to random access, a reference signal (e.g., a sounding reference signal (SRS) or demodulation reference signal (DM-RS)), or uplink data.

The storage 320 may store data, such as a basic program for the operation of the electronic device 120, an application program, configuration information, or the like. The storage 320 may include volatile memory, non-volatile memory, or a combination of volatile memory and non-volatile memory. The storage 320 may provide stored data at the request of the controller 330.

The controller 330 may generally control operations of the electronic device 120. For example, the controller 330 may transmit and receive signals through the communicator 310. The controller 330 may write data to and read data from the storage 320. For these operations, the controller 330 may include at least one processor or microprocessor or may be part of a processor. When the controller 330 is part of a processor, part of the communicator 310 and the controller 330 may be referred to as a communication processor.

According to an embodiment, the controller 330 may further include an interference estimation circuit 331 and a precoding matrix calculation circuit 333. The interference estimation circuit 331 may detect an interference signal that is input to the electronic device 120. For example, the interference signal may include both spatially correlated interference and frequency selective interference. The spatially correlated interference may refer to interference that occurs because of a signal mainly generated from the neighboring base station 130 or 140 or another neighboring wireless communication device (e.g., another terminal). The frequency selective interference may refer to interference that occurs because of distortion of an edge signal in a frequency band, which is caused by using an alternative filter (e.g., a function shaped analog baseband filter (SINC)) because of the design limit of an ideal frequency filter (e.g., a rectangular filter). The interference estimation circuit 331 may detect various interference signals including, for example, at least one of the spatially correlated interference and the frequency selective interference. The interference estimation circuit 331 may generate an interference covariance matrix corresponding to the detected interference signals and transmit the interference covariance matrix to the precoding matrix calculation circuit 333.

The precoding matrix calculation circuit 333 may calculate a precoding matrix. According to an embodiment, the precoding matrix calculation circuit 333 may receive, from the interference estimation circuit 331, an interference covariance matrix corresponding to a result of detecting interference signals. The precoding matrix calculation circuit 333 may convert the interference covariance matrix into an SRS precoding matrix. The precoding matrix calculation circuit 333 may transmit the SRS precoding matrix to a precoder such that an SRS to be transmitted to the base station 110 may be multiplied by the SRS precoding matrix.

Figure 4A:
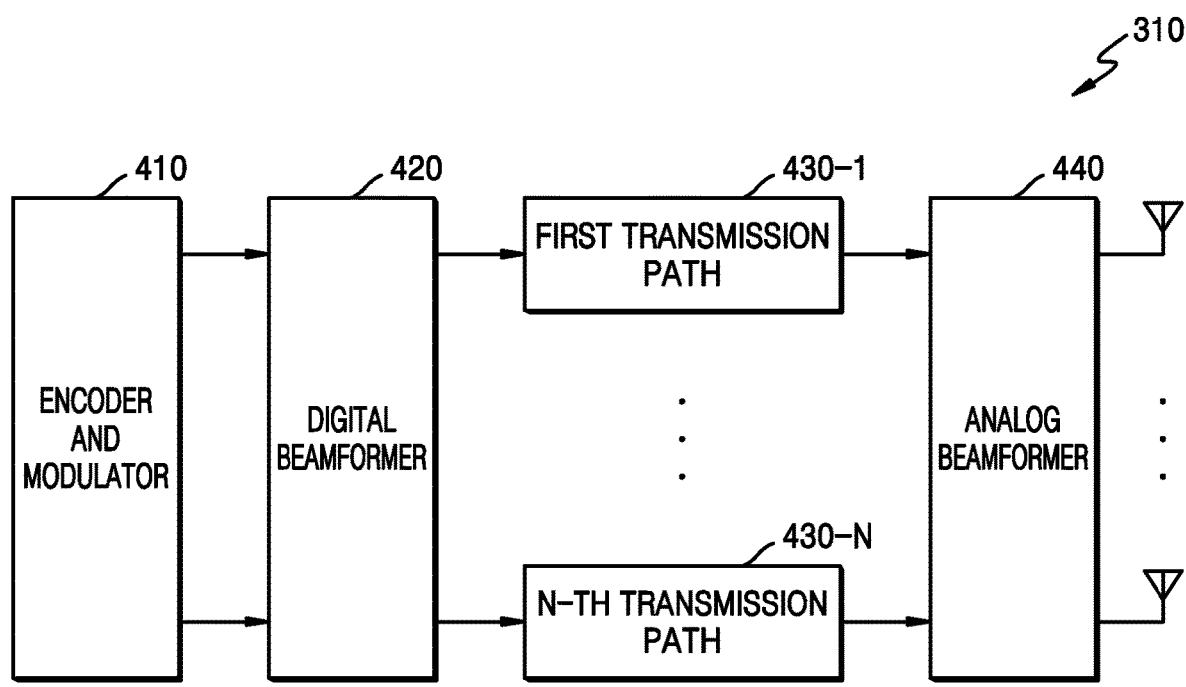
FIG. 4A illustrates an example of the detailed configuration of a communicator in FIG. 3, according to embodiments.

FIG. 4A illustrates an example of a detailed configuration of the communicator 310 in FIG. 3. In detail, FIG. 4A illustrates elements for performing hybrid beamforming when transmitting a radio signal.

Referring to FIG. 4A, the communicator 310 may include an encoder and modulator 410, a digital beamformer 420, first to N-th transmission paths 430-1 to 430-N, and an analog beamformer 440.

The encoder and modulator 410 may perform channel encoding. For channel encoding, at least one of a low density parity check (LDPC) code, a convolution code, and a polar code may be used. The encoder and modulator 410 may generate modulated symbols by performing constellation mapping.

The digital beamformer 420 may perform beamforming on digital signals (e.g., modulated symbols). For example, the digital beamformer 420 may multiply the modulated symbols by beamforming weights. In embodiments, the beamforming weights may be used to change the magnitude and phase of a signal and called a precoding matrix or a precoder. The digital beamformer 420 may output digitally beamformed modulated symbols respectively to the first to N-th transmission paths 430-1 to 430-N. In embodiments, according to a multiple-input multiple-output (MIMO) transmission scheme, the modulated symbols may be multiplexed, or the same modulated symbols may be provided to the first to N-th transmission paths 430-1 to 430-N.

The first to N-th transmission paths 430-1 to 430-N may convert digitally beamformed digital signals into analog signals. For example, each of the first to N-th transmission paths 430-1 to 430-N may include an inverse fast Fourier transform (IFFT) operator, a cyclic prefix (CP) inserter, a DAC, and an up-converter. The CP inserter may be used for an orthogonal frequency division multiplexing (OFDM) scheme, and may be omitted in embodiments in which a different physical layer scheme (e.g., a filter bank multi-carrier (FBMC) scheme) is used. For example, the first to N-th transmission paths 430-1 to 430-N may provide independent signal processing for multiple streams generated through digital beamforming. However, in embodiments, some of the elements of the first to N-th transmission paths 430-1 to 430-N may be shared.

The analog beamformer 440 may perform beamforming on analog signals. For example, the analog beamformer 440 may multiply the analog signals by beamforming weights. In embodiments, the beamforming weights may be used to change the magnitude and phase of a signal.

Figure 4B:
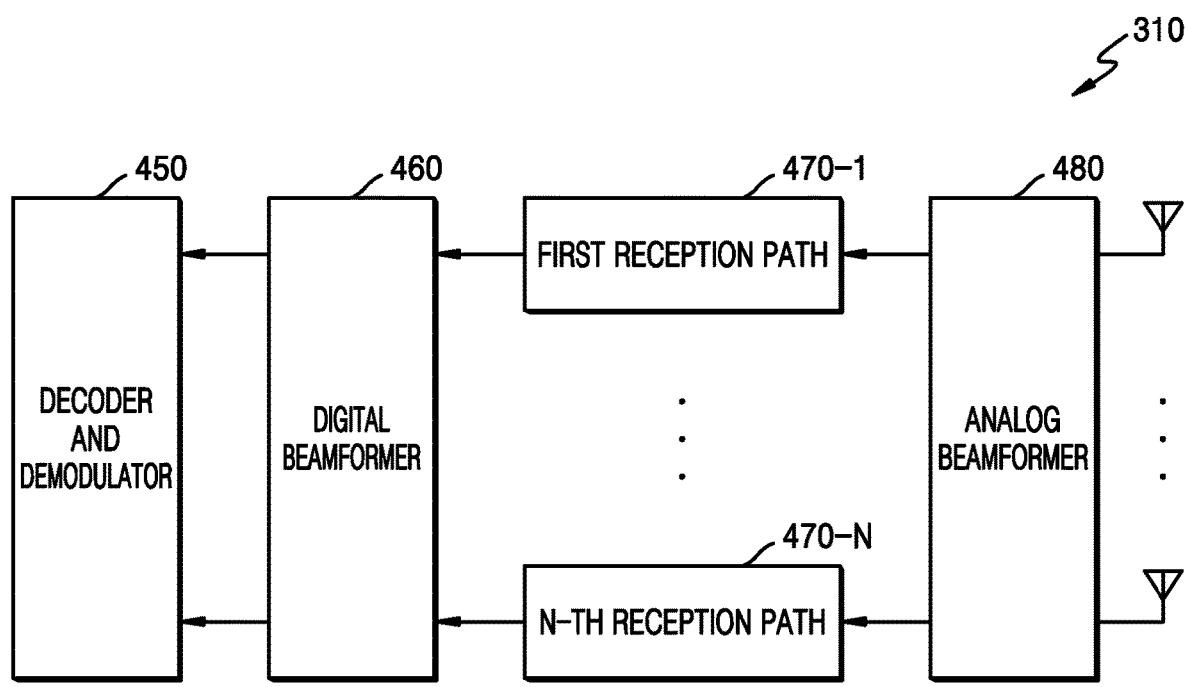
FIG. 4B illustrates an example of the detailed configuration of a communicator in FIG. 3, according to embodiments.

FIG. 4B illustrates an example of a detailed configuration of the communicator 310 in FIG. 3. In detail, FIG. 4B illustrates elements for performing hybrid beamforming when receiving a radio signal.

According to various embodiments, the communicator 310 may include a decoder and demodulator 450, a digital beamformer 460, first to N-th reception paths 470-1 to 470-N, and an analog beamformer 480.

The decoder and demodulator 450 may perform channel decoding. For the channel decoding, at least one of an LDPC code, a convolution code, a polar code, and a turbo code may be used.

According to various embodiments, the digital beamformer 460 and the analog beamformer 480 may respectively correspond to the digital beamformer 420 and the analog beamformer 440 in FIG. 4A.

The first to N-th reception paths 470-1 to 470-N may convert beamformed analog signals into digital signals. For example, each of the first to N-th reception paths 470-1 to 470-N may include a fast Fourier transform (FFT) operator, an ADC, a CP remover, a serial-to-parallel converter, and a down-converter. In detail, each of the first to N-th reception paths 470-1 to 470-N may generate a serial time-domain baseband signal by down-converting a received signal into a baseband frequency and removing a CP from the received signal, convert the serial time-domain baseband signal into parallel time-domain signals, generate N parallel frequency-domain signals by performing an FFT algorithm on the parallel time-domain signals, and convert the N parallel frequency-domain signals into a sequence of modulated data symbols. For example, the first to N-th reception paths 470-1 to 470-N may provide independent signal processing for multiple streams generated through analog beamforming. However, in embodiments, some of the elements of the first to N-th reception paths 470-1 to 470-N may be shared.

Figure 5:
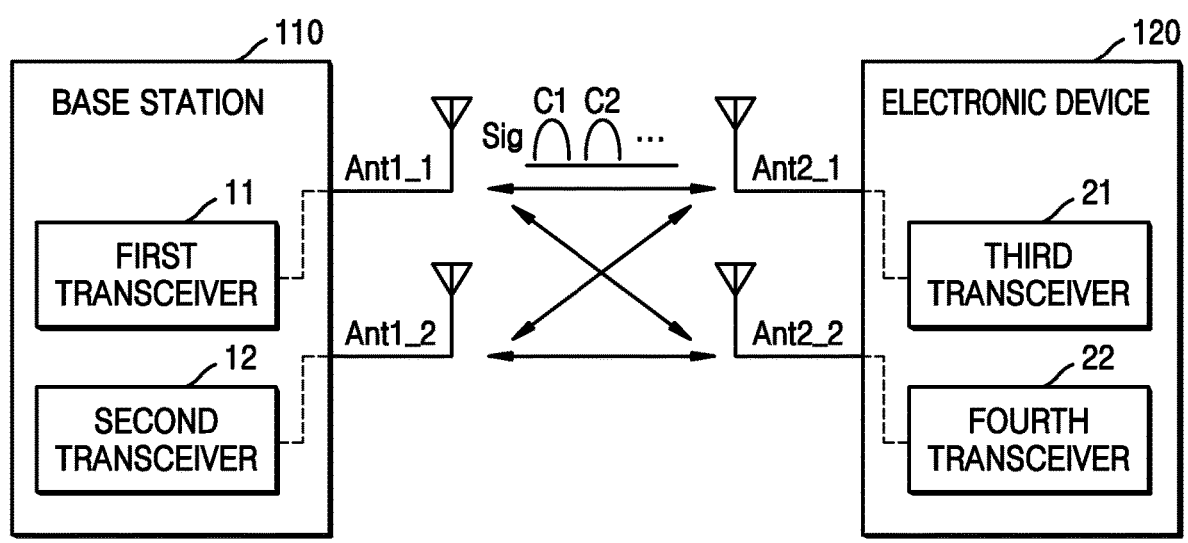
FIG. 5 illustrates an antenna port according to embodiments.

FIG. 5 illustrates an antenna port according to embodiments.

Referring to FIG. 5, a base station 110 may communicate with an electronic device 120 by using MIMO. For the communication, the base station 110 may include a plurality of antennas, e.g., first and second antennas Ant1_1 and Ant1_2, and the electronic device 120 may include a plurality of antennas, e.g., third and fourth antennas Ant2_1 and Ant2_2. Although each of the base station 110 and the electronic device 120 are illustrated in FIG. 5 as including two antennas (e.g., the first and second antennas Ant1_1 and Ant1_2 or the third and fourth antennas Ant2_1 and Ant2_2), embodiments are not limited thereto. In embodiments, each of the base station 110 and the electronic device 120 may include, for example, three or more antennas.

The base station 110 may include a first transceiver 11, a second transceiver 12, the first antenna Ant1_1, and the second antenna Ant1_2. Each of the first transceiver 11 and the second transceiver 12 may be connected to a single antenna. For example, the first transceiver 11 may be connected to the first antenna Ant1_1, and the second transceiver 12 may be connected to the second antenna Ant1_2. When the base station 110 operates as a transmitting device, the first transceiver 11 and the second transceiver 12 may operate as transmitters. When the base station 110 operates as a receiving device, the first transceiver 11 and the second transceiver 12 may operate as receivers.

In a transmission mode, the first transceiver 11 may generate a first signal Sig by merging a first component carrier C1 with a second component carrier C2, and output the first signal Sig to the electronic device 120. The first transceiver 11 may extract both the first component carrier C1 and the second component carrier C2 from the first signal Sig. In embodiments, each of the first transceiver 11 and the second transceiver 12 may not individually transmit a single component carrier, but may instead merge and transmit a plurality of component carriers. In embodiments, each of the first transceiver 11 and the second transceiver 12 may not extract only a single component carrier, but may instead extract a plurality of component carriers.

The electronic device 120 may include a third transceiver 21, a fourth transceiver 22, the third antenna Ant2_1, and the fourth antenna Ant2_2. The electronic device 120 may be substantially the same as. or may be similar to, the base station 110, and thus, redundant descriptions thereof may be omitted.

Figure 6:
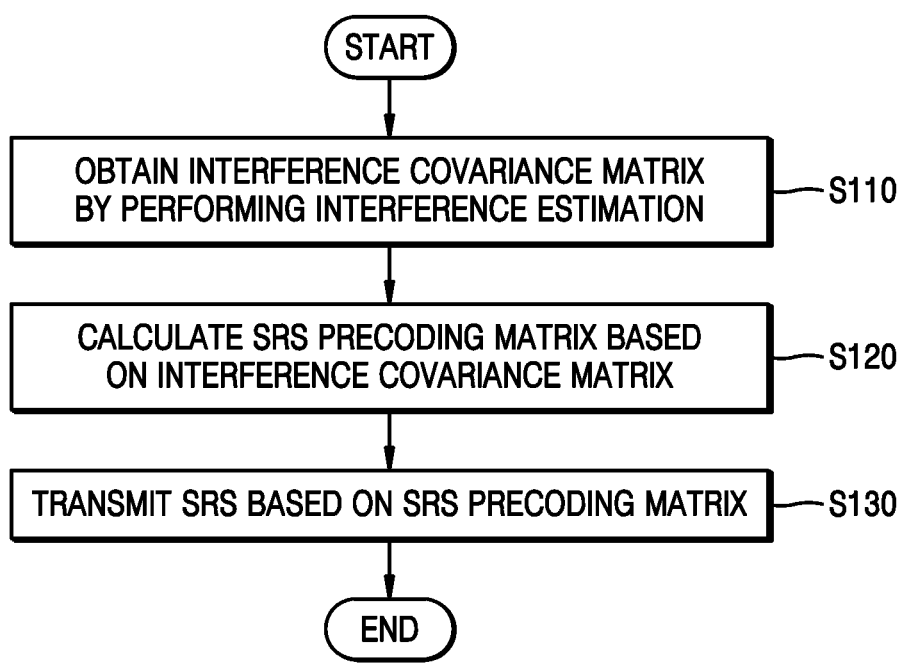
FIG. 6 is a flowchart of an operating method of an electronic device, according to embodiments.

FIG. 6 is a flowchart of an operating method of the electronic device 120, according to embodiments.

Referring to FIG. 6, the electronic device 120 may obtain an interference covariance matrix by performing interference estimation in operation S110. The electronic device 120 may perform interference estimation using the interference estimation circuit 331 of the controller 330. An inter-cell signal may be a target of the interference estimation. For example, the electronic device 120 may receive, as interference signals, signals transmitted from the neighboring base stations 130 and 140.

According to an embodiment, the electronic device 120 may directly estimate an interference channel when the pattern of an interference signal is known. For example, when the electronic device 120 has established a radio resource control (RRC) connection with the neighboring base stations 130 and 140, the electronic device 120 may store information about the transmission pattern of reference signals of the neighboring base stations 130 and 140. In embodiments, the electronic device 120 may receive, from the base station 110, and store information about the transmission pattern of reference signals of the neighboring base stations 130 and 140. In this case, the electronic device 120 may directly estimate an interference channel, based on the transmission pattern of interference signals of the neighboring base stations 130 and 140.

According to an embodiment, the electronic device 120 may perform interference estimation without knowing the pattern of interference signals. For example, when the electronic device 120 has not established an RRC connection with the neighboring base stations 130 and 140 or has not received, from the base station 110, information about the transmission pattern of reference signals of the neighboring base stations 130 and 140, the electronic device 120 may indirectly estimate an interference channel. For example, the electronic device 120 may obtain an interference covariance matrix by subtracting a term of a reference signal, which has been agreed to be exchanged with the base station 110, from received signals and averaging results of the subtraction.

The electronic device 120 may calculate an SRS precoding matrix based on the interference covariance matrix in operation S120. The SRS precoding matrix may be multiplied by an SRS that the electronic device 120 transmits to the base station 110. The electronic device 120 may calculate the SRS precoding matrix using Equation 1 below:

$$W_{SRS} = K_{NI}^{-\frac{1}{2}} \quad \text{(Eq. 1)}$$

In embodiments, $K_{NI}$ may represent the interference covariance matrix, and $W_{SRS}$ may represent the SRS precoding matrix. An example process for deriving the SRS precoding matrix is described below.

Downlink signals between the base station 110 and the electronic device 120 may be given by Equation 2 below:

$$y_{DL} = H_{DL} W_{DL} x_{DL} + H_I x_I + n_{DL} \quad \text{(Eq. 2)}$$

Here, $y_{DL}$ may represent a downlink reception signal, $H_{DL}$ may represent a downlink channel matrix, $W_{DL}$ may represent a downlink precoding matrix, $x_{DL}$ may represent a downlink transmission signal, $H_I$ may represent an interference channel matrix with respect to L interference signal streams, $x_I$ may represent an interference signal, and $n_{DL}$ may represent a noise signal.

In embodiments, a downlink channel capacity may be given by Equation 3.

$$C_{DL}=\log_2 \det(I_N+K_D K_{NI}^{-1}). \tag{Eq. 3}$$

Here, $C_{DL}$ may represent the downlink channel capacity, and Equation 4 and Equation 5 below may be used to determine $K_D$ and $K_{NI}$. And, $I_N$ may represent identity matrix.

$$K_D=E[(H_{DL}W_{DL}x_{DL})(H_{DL}W_{DL}x)^H]=(H_{DL}W_{DL})(H_{DL}W_{DL})^H \tag{Eq. 4}$$

$$K_{NI}=E[(H_I x_I+n_{DL})(H_I x_I+n_{DL})^H]=H_I R_I H_I^H+\sigma^2 I_N \tag{Eq. 5}$$

In embodiments, E may represent an operator for mean calculation, superscript H may represent an operator for conjugate transpose (Hermitian transpose) $K_D$ may represent a covariance matrix with respect to the downlink transmission signal, $K_{NI}$ may represent a covariance matrix with respect to interference and noise signals, and $\sigma^2 I_N$ may represent AWGN (Additive White Gaussian Noise) power.

Optimal downlink precoding for maximizing the downlink channel capacity of Equation 3 may be calculated using Equation 6 and Equation 7 below:

$$\overline{H_{DL}} = K_{NI}^{-\frac{1}{2}} H_{DL} = USV^H \tag{Eq. 6}$$

$$W_{DL(optimal)} = P^{\frac{1}{2}} V \tag{Eq. 7}$$

In embodiments, U, S, and V may be calculated by singular value decomposition of an effective channel matrix $\overline{H_{DL}}$, which may be whitened considering interference information. P may represent a diagonal matrix in which each diagonal element indicates electrical power assigned to a stream. Electrical power may be determined by a waterfiling algorithm, by which a channel gain of a stream is calculated based on a diagonal element of S.

According to an embodiment, an environment with no interference signal may be considered, and an SRS that the electronic device 120 transmits to the base station 110 may be determined according to Equation 8.

$$y_{SRS}=H_{UL}x_{SRS}n_{UL} \tag{Eq. 8}$$

In embodiments, $y_{SRS}$ may represent an uplink signal received by the base station 110, $H_{UL}$ may represent an uplink channel matrix transmitted by the electronic device 120, $x_{SRS}$ may represent an uplink transmission signal transmitted by the electronic device 120, and $n_{UL}$ may represent a noise signal.

Based on an assumption that channel reciprocity is valid, the base station 110 may estimate a downlink channel toward the electronic device 120 using Equation 9.

$$H_{DL}=H_{UL}^T \tag{Eq. 9}$$

For example, in an environment with no interference, the base station 110 may obtain a downlink precoding matrix by transposing an uplink channel matrix, based on the channel reciprocity.

According to various embodiments, based on an assumption that the electronic device 120 transmits an SRS according to an SRS precoding matrix, Equation 10 may be determined.

$$y_{SRS}=H_{UL}K_{NI}^{-1/2}x_{SRS}+n_{UL} \tag{Eq. 10}$$

Referring to Equations 6 and 10, a precoding matrix optimizing a downlink channel capacity may be determined according to Equation 11.

$$\overline{H_{DL}}=(H_{UL}K_{NI}^{-1/2})^T=K_{NI}^{-1/2}H_{DL} \tag{Eq. 11}$$

For example, it may be seen that when the electronic device 120 transmits an SRS to the base station 110 based on an SRS precoding matrix, a downlink precoding matrix calculated by the base station 110 may be identical to a precoding matrix optimizing a downlink channel capacity.

The electronic device 120 may transmit an SRS to the base station 110, based on the SRS precoding matrix, in operation S130. For example, the precoding matrix calculation circuit 333 may provide the SRS precoding matrix to a precoder. The precoder may generate a transmission signal by multiplying an SRS to be transmitted to the base station 110 by the SRS precoding matrix.

Figure 7:
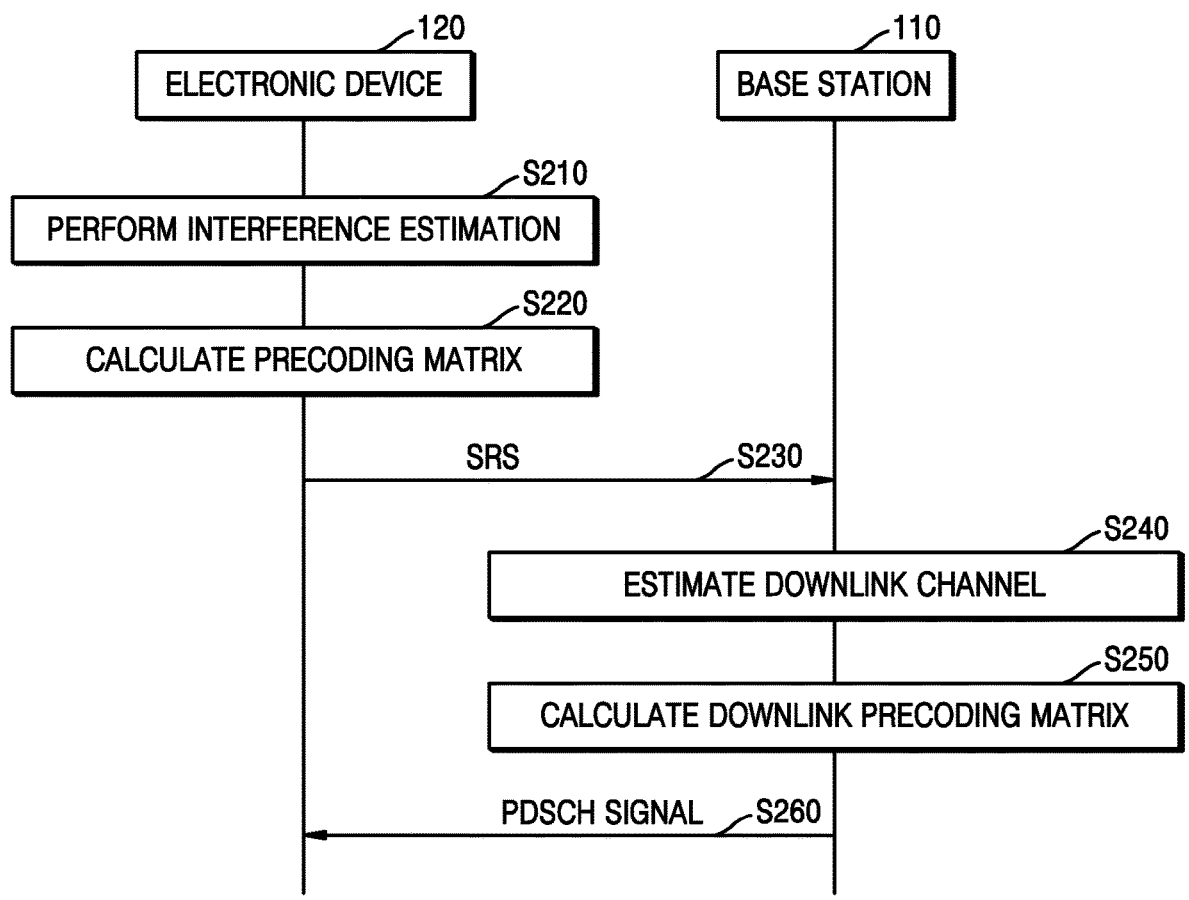
FIG. 7 illustrates signal exchanges between a base station and an electronic device, according to embodiments.

FIG. 7 illustrates signal exchanges between a base station and an electronic device, according to embodiments.

Referring to FIG. 7, the electronic device 120 may perform interference estimation in operation S210. The electronic device 120 may perform the interference estimation using the interference estimation circuit 331. An inter-cell signal may be a target of the interference estimation. For example, the electronic device 120 may obtain an interference covariance matrix by subtracting a term of a reference signal, which has been agreed to be exchanged with the base station 110, from received signals, and averaging results of the subtraction.

The electronic device 120 may calculate a precoding matrix in operation S220. The precoding matrix may include the SRS precoding matrix in FIG. 6. For example, the electronic device 120 may calculate the SRS precoding matrix based on an interference covariance matrix. The interference covariance matrix may be obtained based on a result of the interference estimation in operation S210.

The electronic device 120 may transmit an SRS to the base station 110 in operation S230. For example, the electronic device 120 may generate the SRS by multiplying, using a precoder, the SRS precoding matrix by a signal to be transmitted to the base station 110. The SRS may include a reference signal that has been precoded reflecting interference information of the electronic device 120.

The base station 110 may estimate a downlink channel in operation S240. In embodiments, the base station 110 may estimate the downlink channel based on the SRS received from the electronic device 120. For example, the base station 110 may not recognize whether the SRS is multiplied with an SRS precoding matrix reflecting the interference information of the electronic device 120. The downlink channel estimated by the base station 110 may be a channel on which interference signals experienced by the electronic device 120 is considered.

The base station 110 may calculate a downlink precoding matrix for a downlink signal, based on the downlink channel, in operation S250. In embodiments, the downlink precoding matrix may be a matrix that maximizes a downlink channel capacity.

The base station 110 may transmit a physical downlink shared channel (PDSCH) signal to the electronic device 120 in operation S260. In embodiments, the PDSCH signal may be generated by multiplying a transmission signal by the downlink precoding matrix calculated in operation S250.

Figure 8:
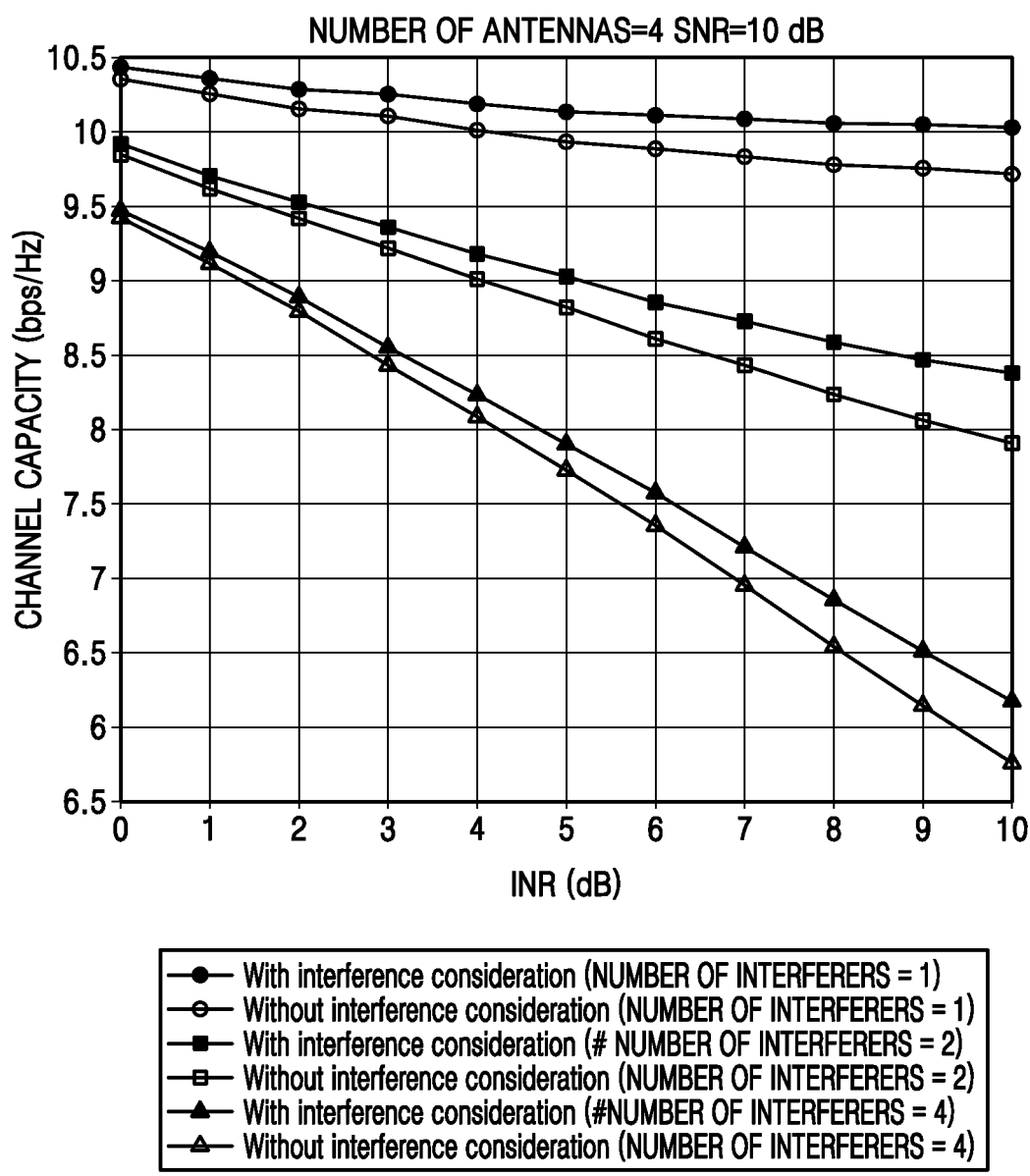
FIG. 8 is a graph showing the increase of downlink channel capacity, according to embodiments.

FIG. 8 is a graph showing an increase of downlink channel capacity when interference is considered, according to an embodiment.

Referring to FIG. 8, the electronic device 120 and the base station 110 may be based on 4×4 MIMO. For example, the electronic device 120 may transmit and receive signals using four different antenna ports, and the base station 110 may also transmit and receive signals using four different antenna ports.

According to an embodiment, the electronic device 120 may not receive an interference signal from the neighboring base stations 130 and 140. For example, the number of interferers may be 1. In this case, it may be seen that the downlink channel capacity increases when the electronic device 120 generates an SRS precoding matrix by performing interference estimation and transmits an SRS based on the SRS precoding matrix. Even when there are no interference signals from the neighboring base stations 130 and 140, there may still be a self-interference signal of the electronic device 120 or an interference signal from another neighboring electronic device. Thus, the downlink channel capacity may be increased even though the number of interferers corresponds to 1.

According to an embodiment, as the number of interferers increases, the downlink channel capacity may decrease. For example, when there are two interferers, the electronic device 120 may receive an interference signal from the neighboring base station 130. When there are four interferers, the electronic device 120 may receive interference signals from three neighboring base stations. As the number of neighboring base stations transmitting an interference signal increases, the strength of the interference signal increases. Accordingly, a channel state may degrade, and channel capacity may decrease. However, in the cases of two interferers and four interferers, the downlink channel capacity may increase when an SRS is transmitted based on an SRS precoding matrix, according to embodiments.

According to an embodiment, the electronic device comprises a communication circuit configured to communicate with a base station, and a control circuit configured to control the communication circuit to obtain a reception signal from the base station, detect an interference signal in the reception signal, generate a sounding reference signal (SRS) precoding matrix based on the interference signal, generate a SRS by multiplying a transmission signal by the SRS precoding matrix, and control the communication circuit to transmit the SRS to the base station.

According to the embodiment, the control circuit is further configured to generate the SRS precoding matrix based on a covariance matrix corresponding to a noise signal and the interference signal in the reception signal.

Figure 9:
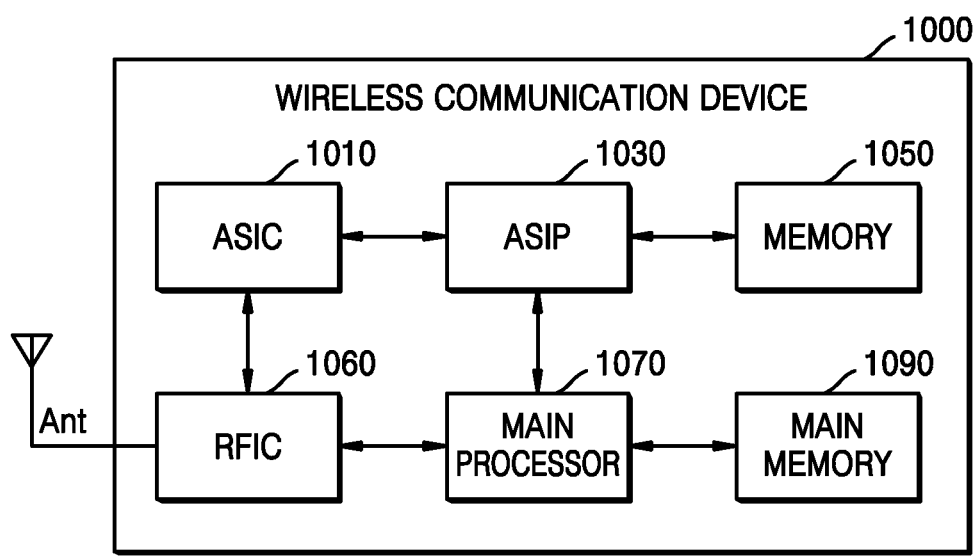
FIG. 9 is a block diagram of a wireless communication device according to embodiments.

FIG. 9 is a block diagram of a wireless communication device according to an embodiment.

Referring to FIG. 9, a wireless communication device 1000 may include a modem and a radio frequency integrated circuit (RFIC) 1060. The modem may include an application specific integrated circuit (ASIC) 1010, an application specific instruction set processor (ASIP) 1030, a memory 1050, a main processor 1070, and a main memory 1090. The wireless communication device 1000 of FIG. 9 may correspond to the electronic device 120, according to an embodiment.

The RFIC 1060 may be connected to an antenna Ant and may receive a signal from or transmit a signal to the outside using a wireless communication network. The ASIP 1030 may be customized for a specific purpose and may support an instruction set dedicated to a specific application and execute an instruction included in the instruction set. The memory 1050 may communicate with the ASIP 1030 and may store a plurality of instructions, which are executed by the ASIP 1030, as a non-transitory storage device. As a non-limiting example, the memory 1050 may include any type of memory, such as random access memory (RAM), read-only memory (ROM), tape, a magnetic disk, an optical disk, volatile memory, non-volatile memory, or a combination thereof, which is accessible by the ASIP 1030.

The main processor 1070 may control the wireless communication device 1000 by executing instructions. For example, the main processor 1070 may control the ASIC 1010 and the ASIP 1030 and process data received through a wireless communication network or a user input to the wireless communication device 1000. For example, the main processor 1070 may perform interference estimation based on a signal received by the wireless communication device 1000, calculate an SRS precoding matrix based on a covariance matrix with respect to interference and noise signals, and generate and transmit an SRS based on the SRS precoding matrix such that interference experienced by the wireless communication device 1000 may be considered. Accordingly, a downlink channel capacity or a downlink data rate may be increased.

The main memory 1090 may communicate with the main processor 1070 and may store a plurality of instructions, which are executed by the main processor 1070, as a non-transitory storage device. As a non-limiting example, the main memory 1090 may include any type of memory, such as RAM, ROM, tape, a magnetic disk, an optical disk, volatile memory, non-volatile memory, or a combination thereof, which is accessible by the main processor 1070.

While embodiments have been particularly shown and described, it will be understood that various changes in form and details may be made therein without departing from the spirit and scope of the following claims.

What is claimed is:

1. An electronic device comprising:

a communication circuit configured to receive a reception signal including an interference signal, and to transmit a sounding reference signal (SRS) to a base station; and a control circuit comprising an interference estimation circuit configured to detect the interference signal in the reception signal, and a precoding matrix calculation circuit configured to generate an SRS precoding matrix corresponding to the SRS, based on a detection result obtained by the interference estimation circuit, wherein the control circuit is configured to control the communication circuit to transmit the SRS to the base station, wherein the SRS is generated by multiplying a transmission signal by the SRS precoding matrix, and wherein the interference estimation circuit is further configured to obtain, from the base station, information about a transmission pattern of a downlink signal transmitted by at least one neighboring base station, and estimate an interference channel based on the information about the transmission pattern.

2. The electronic device of claim 1, wherein the interference estimation circuit is further configured to calculate a covariance matrix corresponding to a noise signal and the interference signal in the reception signal.

3. The electronic device of claim 2, wherein the precoding matrix calculation circuit is further configured to receive the covariance matrix from the interference estimation circuit and calculate the SRS precoding matrix according to a following equation:

$$W_{SRS} = K_{NI}^{-\frac{1}{2}},$$

where $K_{NI}$ represents the covariance matrix, and $W_{SRS}$ represents the SRS precoding matrix.

4. The electronic device of claim 1, wherein the information about the transmission pattern is obtained from the base station, based on one of a radio resource control (RRC) protocol, a media access control element (MAC CE), and downlink control information (DCI).

5. The electronic device of claim 3, wherein the communication circuit is further configured to
receive the downlink signal based on a precoding matrix according to a downlink channel estimated by the base station using the SRS.

6. The electronic device of claim 5, wherein the SRS precoding matrix comprises a matrix which maximizes a capacity of the downlink channel estimated by the base station.

7. An operating method of an electronic device, the operating method comprising:
performing interference estimation based on a reception signal including an interference signal;
generating a sounding reference signal (SRS) precoding matrix, based on a result of the interference estimation; and
transmitting an SRS to a base station,
wherein the SRS is generated by multiplying a transmission signal by the SRS precoding matrix, and
wherein the performing of the interference estimation comprises obtaining, from the base station, information about a transmission pattern of a downlink signal transmitted by at least one neighboring base station, and estimating an interference channel based on the information about the transmission pattern.

8. The operating method of claim 7, wherein the information about the transmission pattern is obtained from the base station, based on one of a radio resource control (RRC) protocol, a media access control element (MAC CE), and downlink control information (DCI).

9. The operating method of claim 7, wherein the result of the interference estimation corresponds to a covariance matrix based on noise and the interference signal in the reception signal.

10. The operating method of claim 9, wherein the SRS precoding matrix is calculated using a following equation:

$$W_{SRS} = K_{NI}^{-\frac{1}{2}},$$

where $W_{SRS}$ represents the SRS precoding matrix, and is $K_{NI}$ represents the covariance matrix.

11. The operating method of claim 10, further comprising receiving the downlink signal based on a precoding matrix according to a downlink channel estimated by the base station using the SRS.

12. The operating method of claim 11, wherein the SRS precoding matrix includes a matrix which maximizes a capacity of the downlink channel estimated by the base station.

13. A wireless communication system comprising:
a base station configured to estimate a downlink channel based on a sounding reference signal (SRS); and
an electronic device comprising:
a communication circuit configured to perform at least one from among transmitting the SRS to the base station and receiving a reception signal including an interference signal, and
a control circuit comprising an interference estimation circuit configured to detect the interference signal in the reception signal, and a precoding matrix calculation circuit configured to generate an SRS precoding matrix corresponding to the SRS, based on a detection result obtained by the interference estimation circuit,
wherein the control circuit is configured to control the communication circuit to transmit the SRS to the base station,
wherein the SRS is generated by multiplying a transmission signal by the SRS precoding matrix, and
wherein the interference estimation circuit is further configured to obtain, from the base station, information about a transmission pattern of a downlink signal transmitted by at least one neighboring base station, and estimate an interference channel based on the information about the transmission pattern.

14. The wireless communication system of claim 13, wherein the interference estimation circuit is further configured to calculate a covariance matrix corresponding to a noise signal and the interference signal in the reception signal.

15. The wireless communication system of claim 14, wherein the precoding matrix calculation circuit is further configured to receive the covariance matrix from the interference estimation circuit and calculate the SRS precoding matrix using a following equation:

$$W_{SRS} = K_{NI}^{-\frac{1}{2}},$$

where $K_{NI}$ represents the covariance matrix, and $W_{SRS}$ represents the SRS precoding matrix.

16. The wireless communication system of claim 15, wherein the base station is further configured to transmit, to the electronic device, the downlink signal based on a precoding matrix according to the downlink channel.

17. The wireless communication system of claim 16, wherein the SRS precoding matrix includes a matrix which maximizes a capacity of the downlink channel estimated by the base station.

18. The wireless communication system of claim 13, wherein the information about the transmission pattern is obtained from the base station, based on one of a radio resource control (RRC) protocol, a media access control element (MAC CE), and downlink control information (DCI).

* * * * *